United States Patent
Galbraith et al.

(10) Patent No.: US 11,907,123 B2
(45) Date of Patent: Feb. 20, 2024

(54) FLASH MEMORY GARBAGE COLLECTION

(71) Applicant: International Business Machines Corporation, Armonk, NY (US)

(72) Inventors: Robert Edward Galbraith, Rochester, MN (US); Daniel Frank Moertl, Rochester, MN (US); Rick A. Weckwerth, Oronoco, MN (US); Matthew Szekely, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 3 days.

(21) Appl. No.: 17/234,897

(22) Filed: Apr. 20, 2021

(65) Prior Publication Data

US 2022/0334967 A1    Oct. 20, 2022

(51) Int. Cl.
*G06F 12/0804* (2016.01)
*G06F 12/02* (2006.01)

(52) U.S. Cl.
CPC ...... *G06F 12/0804* (2013.01); *G06F 12/0246* (2013.01); *G06F 12/0253* (2013.01); *G06F 2212/7205* (2013.01)

(58) Field of Classification Search
CPC ............. G06F 12/0804; G06F 12/0246; G06F 12/0253; G06F 2212/7205
See application file for complete search history.

(56) References Cited

U.S. PATENT DOCUMENTS

| | | | |
|---|---|---|---|
| 10,185,658 B2 | 1/2019 | O'Krafka et al. | |
| 10,430,332 B2 | 10/2019 | Gusak | |
| 10,552,288 B2 | 2/2020 | Tomic et al. | |
| 10,613,975 B2 | 4/2020 | Jung et al. | |
| 10,642,505 B1 * | 5/2020 | Kuzmin | G06F 3/0679 |

(Continued)

FOREIGN PATENT DOCUMENTS

CN    109739775 A  *  5/2019

OTHER PUBLICATIONS

Jung et al.; "2LGC: An Atomic-Unit Garbage Collection Scheme With a Two-Level List For NAND Flash Storage", ESA'12 International Conference On, pp. 22-28, Jul. 16-19, 2012.

(Continued)

*Primary Examiner* — Michael Krofcheck
(74) *Attorney, Agent, or Firm* — Cantor Colburn LLP; Stosch Sabo

(57) ABSTRACT

Embodiments include methods, systems and computer program products for managing a flash memory device. Aspects include monitoring a percentage of memory of the flash memory device that is in a ready to use state. Aspects also include operating the flash memory device in a first operating mode based on a determination that the percentage is greater than a first threshold value. Aspects further include operating the flash memory device in a second operating mode based on a determination that the percentage has fallen below the first threshold value. Aspects include operating the flash memory device in a third operating mode until the percentage exceeds the first threshold value based on a determination that the percentage has fallen below a second threshold value, which is lower than the first threshold value. The erasing of ready to erase memory block stripes is only performed during the third operating mode.

15 Claims, 6 Drawing Sheets

(56) References Cited

U.S. PATENT DOCUMENTS

| | | | |
|---|---|---|---|
| 10,698,808 B2 | 6/2020 | Pandurangan et al. | |
| 10,901,891 B2 | 1/2021 | Byun | |
| 11,593,262 B1* | 2/2023 | Henze | G06F 12/0238 |
| 2008/0282024 A1* | 11/2008 | Biswas | G06F 12/0246 711/162 |
| 2009/0112952 A1 | 4/2009 | Adams, III et al. | |
| 2014/0052897 A1 | 2/2014 | Goss et al. | |
| 2014/0156967 A1* | 6/2014 | Meir | G06F 16/185 711/202 |
| 2014/0215129 A1* | 7/2014 | Kuzmin | G06F 12/0246 711/103 |
| 2015/0177995 A1* | 6/2015 | Camp | G06F 11/1048 711/103 |
| 2016/0147651 A1* | 5/2016 | Desai | G06F 11/1004 711/103 |
| 2016/0188221 A1* | 6/2016 | Janik | G06F 3/0611 711/103 |
| 2018/0046543 A1* | 2/2018 | Canepa | H03M 13/154 |
| 2018/0232181 A1* | 8/2018 | Zhou | G06F 3/0611 |
| 2018/0373450 A1* | 12/2018 | Ji | G06F 3/0679 |
| 2020/0073571 A1* | 3/2020 | Chen | G06N 5/04 |
| 2020/0110697 A1 | 4/2020 | Wu et al. | |
| 2020/0218652 A1* | 7/2020 | Huang | G06F 12/10 |
| 2020/0257621 A1 | 8/2020 | Pletka et al. | |
| 2020/0326884 A1* | 10/2020 | Hu | G06F 3/0656 |
| 2021/0004159 A1 | 1/2021 | Pletka et al. | |
| 2021/0019074 A1 | 1/2021 | Akin et al. | |
| 2021/0240392 A1* | 8/2021 | Masuo | G06F 12/0246 |

OTHER PUBLICATIONS

Lengauer et al.; "The Taming of the Shrew: Increasing Performance . . . For Java Garbage Collectors", ICPE'14 5th ACM/SPEC Inter. Conf. On, pp. 111-122, Mar. 22-26, 2014.

Shahidi et al.; "Exploring the Potentials of Parallel Garbage Collection in SSDs For Enterprise Storage Systems", SC IEEE Inter. Conf. On, pp. 1-12, Nov. 13-18, 2016.

Yang et al.; "Reducing Garbage Collection Overhead in SSD Based on Workload Prediction", HotStorage'19 11th USENIX Annual Technical Conference On, pp. 1-6, Jul. 8-12, 2019.

Zhang et al.; "Lazy-RTGC: A Real-Time Lazy Garbage Collection Mechanism . . . Memory Storage Systems", TODAES ACM Transactions On, vol. 20, Iss. 3, pp. 1-32, Jun. 24, 2015.

* cited by examiner

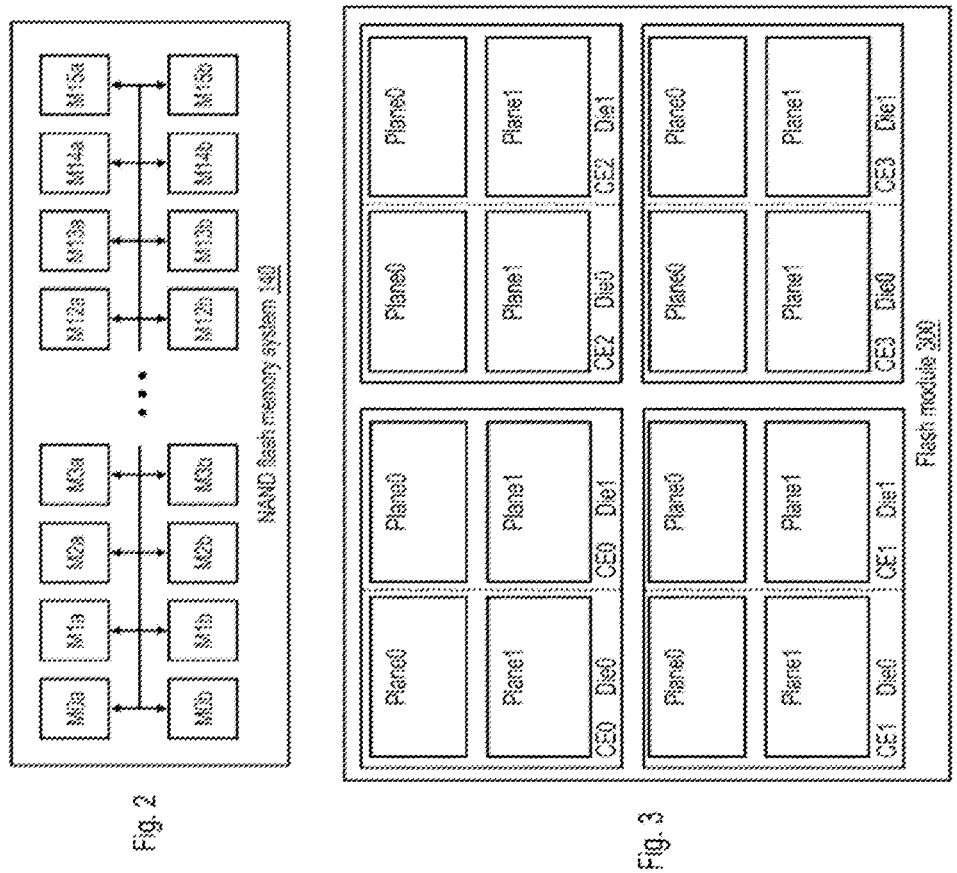

| | Filling Block Stripes | | Pending Block Stripes | |
|---|---|---|---|---|
| Hot | Die# (e.g. 5) | Die# (e.g. 0) | Die# (e.g. 3) | Die# (e.g. 2) |
| Warm | Die# (e.g. 2) | Die# (e.g. 6) | Die# (e.g. 4) | Die# (e.g. 3) |
| Cold | Die# (e.g. 7) | Die# (e.g. 4) | Die# (e.g. 5) | Die# (e.g. 1) |

900

Fig. 9

FLASH MEMORY GARBAGE COLLECTION

BACKGROUND

This disclosure relates to data processing and storage, and more specifically, to controlling the operation of a non-volatile memory, such as a flash memory Flash memory is a non-volatile memory technology that stores one or more bits of data per memory cell as a charge on the floating gate of a transistor. In general, flash must be erased before it can be programmed. An erase operation must be done to an entire block of memory at a time, while a program operation is performed on a page of memory at a time. Because there are many pages per block, a garbage collection process is used to rid a block of all valid pages (i.e. move any pages with valid data somewhere else) so that the block may be erased.

Garbage collection must occur at a rate that is sufficient to produce blocks that are erased and ready to use for program operations. Thus, an efficiency improvement in garbage collection can translate directly into a throughput improvement for program (write) operations.

BRIEF SUMMARY

In one or more example embodiments of the invention, a method controlling the operation of a non-volatile memory is disclosed. The method includes monitoring a percentage of memory of the flash memory device that is in a ready to use state. The method also includes operating the flash memory device in a first operating mode based on a determination that the percentage is greater than a first threshold value. The method further includes operating the flash memory device in a second operating mode based on a determination that the percentage has fallen below the first threshold value. The method also includes operating the flash memory device in a third operating mode until the percentage exceeds the first threshold value based on a determination that the percentage has fallen below a second threshold value, which is lower than the first threshold value. The erasing of ready to erase memory block stripes is only performed during the third operating mode.

A computer program product having a storage device and program code stored in the storage device, wherein the program code, when executed by a controller that controls a non-volatile memory array of a data storage system, causes the controller to monitor a percentage of memory of the flash memory device that is in a ready to use state and operate the flash memory device in a first operating mode based on a determination that the percentage is greater than a first threshold value. The program code also causes the controller to operate the flash memory device in a second operating mode based on a determination that the percentage has fallen below the first threshold value. The program code further causes the controller operate the flash memory device in a third operating mode until the percentage exceeds the first threshold value based on a determination that the percentage has fallen below a second threshold value, which is lower than the first threshold value. Erasing of ready to erase memory block stripes is only performed during the third operating mode.

In one or more example embodiments of the invention, a data storage system having a controller configured to be coupled to a non-volatile memory array, wherein the controller is configured to monitor a percentage of memory of the flash memory device that is in a ready to use state and operate the flash memory device in a first operating mode based on a determination that the percentage is greater than a first threshold value. The controller is also configured to operate the flash memory device in a second operating mode based on a determination that the percentage has fallen below the first threshold value. The controller is further configured to operate the flash memory device in a third operating mode until the percentage exceeds the first threshold value based on a determination that the percentage has fallen below a second threshold value, which is lower than the first threshold value. Erasing of ready to erase memory block stripes is only performed during the third operating mode.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

FIGS. 2, 3, 4, and 5 illustrate an exemplary arrangement of physical memory within a NAND flash memory array in accordance with the present disclosure;

FIG. 9 depicts a table used by a die sequencer for determining which die to use for a pending operation in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Exemplary embodiments generally include methods, systems, and computer program products for controlling the operation of a non-volatile memory and more specifically include methods systems and computer program products for performing an optimized garbage collection process. In general, the efficiency of the garbage collection process largely depends on a variety of factors including, but not limited to, selecting block stripes to garbage collect which are the dirtiest, that is, have the least number of valid pages which must be moved (migrated) before the block can be erased, maximizing the number of overlapped erases which are performed at any one time, avoiding conflicts between multiple program operations whenever possible, and avoiding conflicts between program and erase operations whenever possible.

Figure 1:
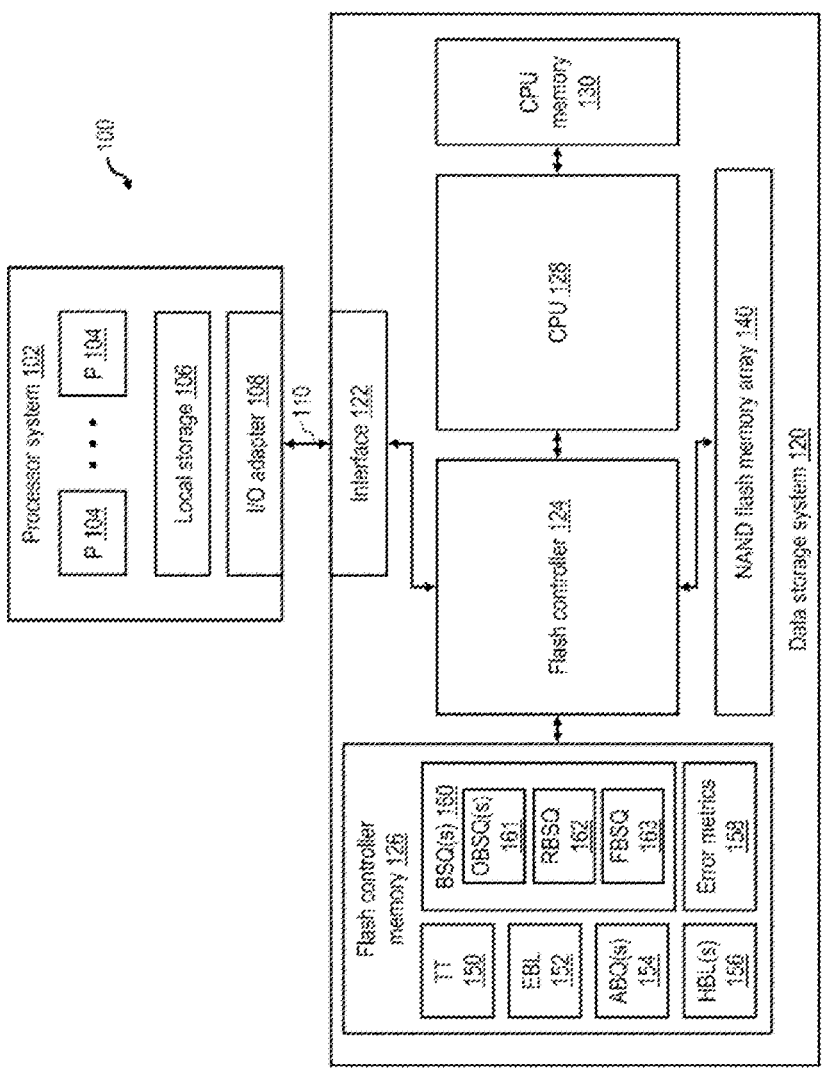
FIG. 1 is a high-level block diagram of a data processing environment in accordance with one embodiment.

With reference now to the figures and with particular reference to FIG. 1, there is illustrated a high-level block diagram of an exemplary data processing environment 100 including a data storage system having a non-volatile memory array as described further herein. As shown, data processing environment 100 includes at least one processor system 102 having one or more processors 104 that process instructions and data. Processor system 102 may additionally include local storage 106 (e.g., dynamic random-access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, PowerPC, Intel X86, or any other processor combined with memory caches, memory controllers, local storage, I/O bus hubs, etc.

Processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel may employ any one or a combination of known or future developed communication protocols, including, for example, Fibre Channel (FC), FC over Ethernet (FCoE), Internet Small Computer System Interface (iSCSI), Transport Control Protocol/Internet Protocol (TCP/IP), Peripheral Component Interconnect Express (PCIe), etc. In other various embodiments, I/O channel 110 may be a direct connection to a processor 102 using a storage class memory interface such as PCIe CXL or OpenCAPI. I/O operations (IOPs) communicated via I/O channel 110 include read IOPs by which processor system 102 requests data from data storage system 120 and write IOPs by which processor system 102 requests storage of data in data storage system 120.

In the illustrated embodiment, data storage system 120 includes an interface 122 through which data storage system 120 receives and responds to IOPs 102 via I/O channel 110. Interface 122 is coupled to a flash controller 124 (e.g., an Application Specific Integrated Circuit (ASIC) or Field Programmable Gate Array (FPGA)) having an associated flash controller memory 126 (e.g., Dynamic Random Access Memory (DRAM)). Flash controller 124 is additionally coupled to a CPU 128 having an associated CPU memory 130 (e.g., DRAM) and further coupled to a non-volatile memory array, such as NAND flash memory array 140. In embodiments in which flash controller 124 is implemented with an FPGA, CPU 128 may program and configure flash controller 124 during start-up of data storage system 120. After startup, in general operation flash controller 124 receives read and write IOPs via I/O channel 110 and interface 122 to read data stored in NAND flash memory array 140 and/or to store data in NAND flash memory array 140. Flash controller 124 services these IOPs, for example, by accessing NAND flash memory array 140 to read or write the requested data from or into NAND flash memory array 140 or by accessing a memory cache (not illustrated) associated with NAND flash memory array 140.

Flash controller 124 implements a flash translation layer (FTL) that provides logical-to-physical address translation to enable access to specific memory locations within NAND flash memory array 140. In general, an IOP received by flash controller 124 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. As is known to those skilled in the art. NAND flash memory, such as that employed in NAND flash memory array 140, is constrained by its construction such that the smallest granule of data that can be accessed by a read or write IOP is fixed at the size of a single flash memory page, for example, 16 kilobytes (kB). The LBA provided by the host device thus corresponds to a page within a logical address space. The flash translation layer translates this LBA into a physical address assigned to a corresponding physical location in NAND flash memory array 140. Flash controller 124 may perform address translation and/or store mappings between logical and physical addresses in a logical-to-physical translation data structure, such as translation table (TT) 150, which may conveniently be stored in flash controller memory 126.

As further shown in FIG. 1, flash controller 124 may maintain one or more additional data structures to track information regarding NAND flash memory array 140, which data structures may also be buffered in flash controller memory 126. These data structures can include, for example, an erased block list (EBL) 152 that identifies blocks of physical memory in NAND flash memory array 140 that have been erased, one or more available block queues (ABQs) 154 that identify blocks of physical memory in NAND flash memory array 140 that are available for programming, and one or more block stripe queues (BSQ) 160, which include one or more occupied block stripe queues (OBSQ) 161 holding block stripes of blocks with written data eligible for garbage collection, a relocation block stripe queue (RBSQ) 162 that identifies block stripes being selected for garbage collection, and a free block stripe queue (FBSQ) 163 for block stripes which currently have no data blocks assigned.

The data structures in flash controller memory 126 can also include one or more heat bin lists (HBLs) 156 that specify an observed access frequency (defined herein as "heat") of each LBA served by data storage system 120. In various embodiments, the heat can indicate frequency of write accesses only or both write and read accesses. The number of heat bins can, but is not required to equal, the number of health grades. In one implementation, three heat bins are defined ranging from coldest (i.e., least frequently accessed) to hottest (i.e., most frequently accessed), and blocks or block stripes of each heat are identified by being placed on a respective one of three HBLs 156. In another implementation, only a single unified HBL 156 is used, and each entry in the HBL 156 includes a heat field encoding the heat bin into which each block or block stripe of physical memory falls. In yet another implementation, HBLs 156 includes two lists, the first one tracking access frequency for each LBA or ranges of LBAs and second one maintaining a heat field encoding the heat bin of each block or block stripe.

The data structures in flash controller memory 126 can further include error metrics 158 that indicate one or more error metrics per region of physical memory (e.g., block or page) in NAND flash memory array 140. For example, error metrics 158 can include the per-page and/or per-block bit error count, bit error rate, and/or rate of change of bit error rate (i.e., the derivative of the bit error rate). As will be appreciated by those skilled in the art, in various embodiments flash controller 124 may combine one or more of the data structures depicted in flash controller memory 126 in a common data structure and/or implement additional data structures to manage NAND flash memory array 140.

NAND flash memory array 140 may take many forms in various embodiments Referring now to FIGS. 2-5, there is depicted one exemplary arrangement of physical memory within a NAND flash memory array 140 in accordance with the present disclosure.

As shown in FIG. 2, NAND flash memory array 140 may be formed from thirty-two (32) individually addressable NAND flash memory storage devices. In the illustrated example, each of the flash memory storage devices M0a-M15b takes the form of a board-mounted flash memory module, for example, a Single Level Cell (SLC), Multi-Level Cell (MLC), Three Level Cell (TLC), or Quad Level Cell (QLC) NAND flash memory module. The thirty-two NAND flash memory modules are arranged in sixteen groups of two (M0a, M0b) through (M15a, M15b). For purposes of the physical addressing scheme, each group of two modules forms a "lane," also sometimes referred to as a "channel," such that NAND flash memory array 140 includes sixteen channels or lanes (Lane0-Lane15). In some embodiments, a NAND configuration of 32 NAND parts with 32 channels (0-31) is used.

In one embodiment, each of the individual lanes has a respective associated bus coupling it to flash controller 124. Thus, by directing its communications to one of the specific communication buses, flash controller 124 can direct its communications to one of the lanes of memory modules Because each communication bus for a given lane is independent of the communication buses for the other lanes, flash controller 124 can issue commands and send or receive data across the various communication buses at the same time, enabling flash controller 124 to access the memory modules corresponding to the individual lanes at, or very nearly at, the same time.

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 124 to enable access to or from the physical memory locations within the corresponding CE Each CE is in turn subdivided into multiple die (e.g., Die0, Die1, etc.) each having multiple planes (e.g., Plane0, Plane1, etc.). In one embodiment, each CE includes sixteen dies and eight planes. Each plane represents a collection of blocks (described below) that, because of the physical layout of the flash memory chips, are physically associated with one another and that utilize common circuitry (e.g., I/O buffers) for the performance of various operations, such as read and write operations.

Figure 5:
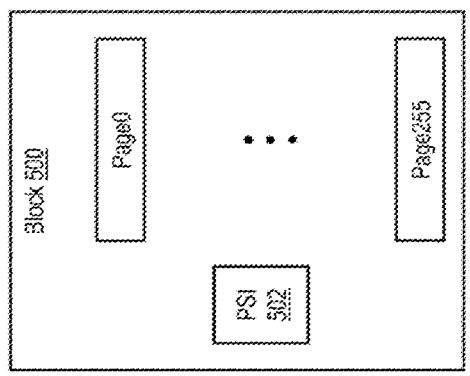
Figure 4:
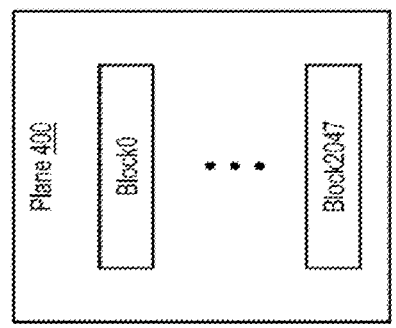

As further shown in FIGS. 4-5, an exemplary plane 400, which can be utilized to implement any of the planes within flash memory module 300 of FIG. 3, includes, for example, 2048 blocks of physical memory in general, a block 500 is a collection of physical pages that are associated with one another, typically in a physical manner. This association is such that a block is defined to be the smallest granularity of physical storage locations that can be erased within NAND flash memory array 140. In the embodiment of FIG. 5, each block 500 includes, for example, 256 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory array 140 on a page-by-page basis but erased on a block-by-block basis. As further shown in FIG. 5, each block 500 preferably includes page status information (PSI) 502, which indicates the status of each physical page in that block 500 as retired (i.e., withdrawn from use) or non-retired (i.e., active or still in use). In various implementations, PSI 502 can be collected into a single data structure (e.g., a vector or table) within block 500, distributed within block 500 (e.g., as one or more bits of metadata appended to each physical page) or maintained elsewhere in data storage system 120 (e.g., in a data structure in flash controller memory 126).

As noted above, data storage system 120 does not generally allow external devices to directly address and/or access the physical memory locations within NAND flash memory array 140. Instead, data storage system 120 is generally configured to present a single contiguous logical address space to the external devices, thus allowing host devices to read and write data to and from LBAs within the logical address space while permitting flash controller 124 and CPU 128 to control where the data that is associated with the various LBAs actually resides in the physical memory locations comprising NAND flash memory array 140. In this manner, the performance and longevity of NAND flash memory array 140 can be intelligently managed and optimized.

As writes occur to data storage system 120, it will be necessary for flash controller 124 and CPU 128 to invalidate the data stored in one of the physical pages of one of the blocks in the NAND flash memory array 140. The new data will then coalesce with data being written and eventually stored in different locations in NAND flash memory array 140. It can be seen then that pages or portions of pages will be invalidated and therefore portions of the NAND flash memory array 140 become unused. Flash controller 124 and CPU 128 will eventually need to reclaim this space through a process called garbage collection. Particular blocks or block stripes consisting of blocks will be chosen based on a number of factors accordingly to the methods shown in FIG. 8. Flash controller 124 logs the physical block addresses (PBAs) of erased blocks in EBL 152. Valid data will be read and written along with new writes from the host into blocks allocated from the one or more ABQs 154.

Because the flash translation layer implemented by data storage system 120 isolates the logical address space made available to host devices from the physical memory within NAND flash memory array 140, the size of NAND flash memory array 140 need not be equal to the size of the logical address space presented to host devices. In most embodiments, it is beneficial to present a logical address space that is less than the total available physical memory (i.e., to over-provision NAND flash memory array 140). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

Figures 6A, 6B:
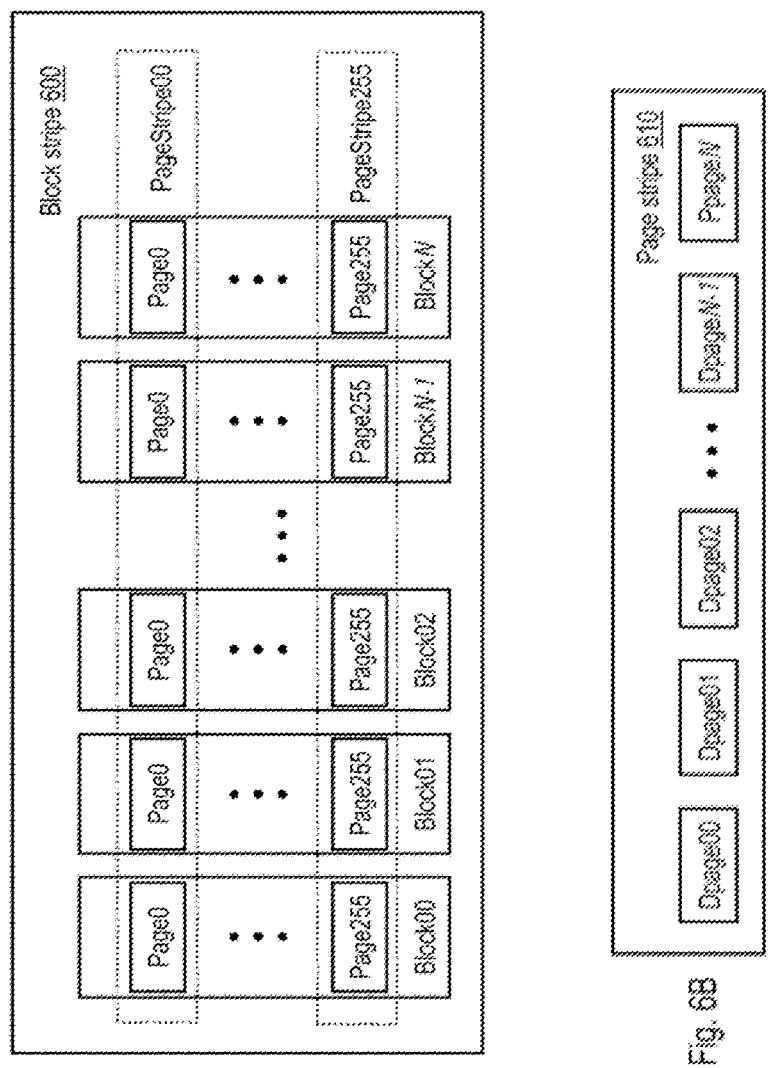
FIG. 6A depicts an exemplary implementation of a block stripe in accordance with the present disclosure.
FIG. 6B depicts an exemplary implementation of a page stripe in accordance with the present disclosure.

In some embodiments, data is written to NAND flash memory array 140 one physical page at a time. In other embodiments in which more robust error recovery is desired, data is written to groups of associated physical pages of NAND flash memory array 140 referred to herein as "page stripes." In one embodiment, all pages of a page stripe are associated with different lanes to achieve high write bandwidth. Because in many implementations the smallest erase unit is a block, page stripes are grouped into a block stripe as is shown in FIG. 6A, where each block in the block stripe is associated to a different lane. When a block stripe is built, any free block from the ABQ of a lane can be chosen, but preferably all blocks should have the same or similar health grade. Note that the block selection can be further restricted to be from the same plane, die, and/or chip enable. Once a block from each lane has been picked, page stripes are preferably formed from pages with the same page number from all blocks in the block stripe. While the lengths of the various page stripes stored into NAND flash memory array 140 can and preferably do vary, in one embodiment each page stripe includes two to thirty-one data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The addition of a data protection page as illustrated requires that garbage collection be performed for all page stripes of the same block stripe at the same time. After garbage collection of the block stripe completes, the block stripe can be dissolved, and each block can be placed into the EBL or ABQ as explained below.

Figure 7:
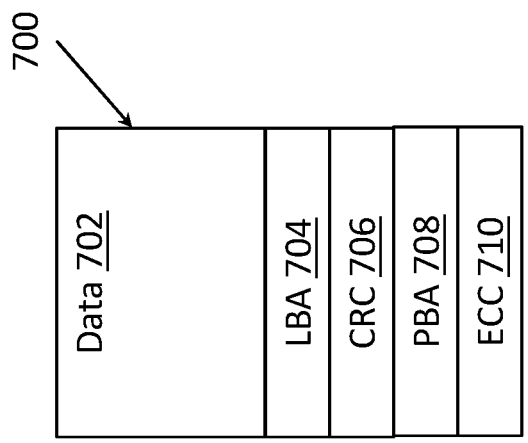
FIG. 7 depicts an exemplary data page in accordance with the present disclosure.

FIG. 7 illustrates an exemplary format of each data page within page stripe 610 of FIG. 6. In this example, each data page 700 includes a 16 kB data field 702, as well as additional fields for metadata describing the data page. In the illustrated example, these metadata fields include an LBA field 704 containing the LBAs stored in data page 700, a CRC field 706 containing the CRC value computed for the combination of data field 702 and LBA field 704, a Physical Block Address (PBA) field 708 and an ECC field 710 containing an ECC value calculated, in the illustrated example, from a combination of contents of data field 702, LBA field 704, the PBA field 708 and CRC field 710.

Having described the general physical structure and operation of one exemplary embodiment of a data storage system 120, certain operational aspects of data storage system 120 are now described, including aspects relating to garbage collection, allocation of blocks for programming, writing (programming) pages of NAND flash memory array 140, reading data from NAND flash memory array 140, and selection of blocks for garbage collection.

Figure 8:
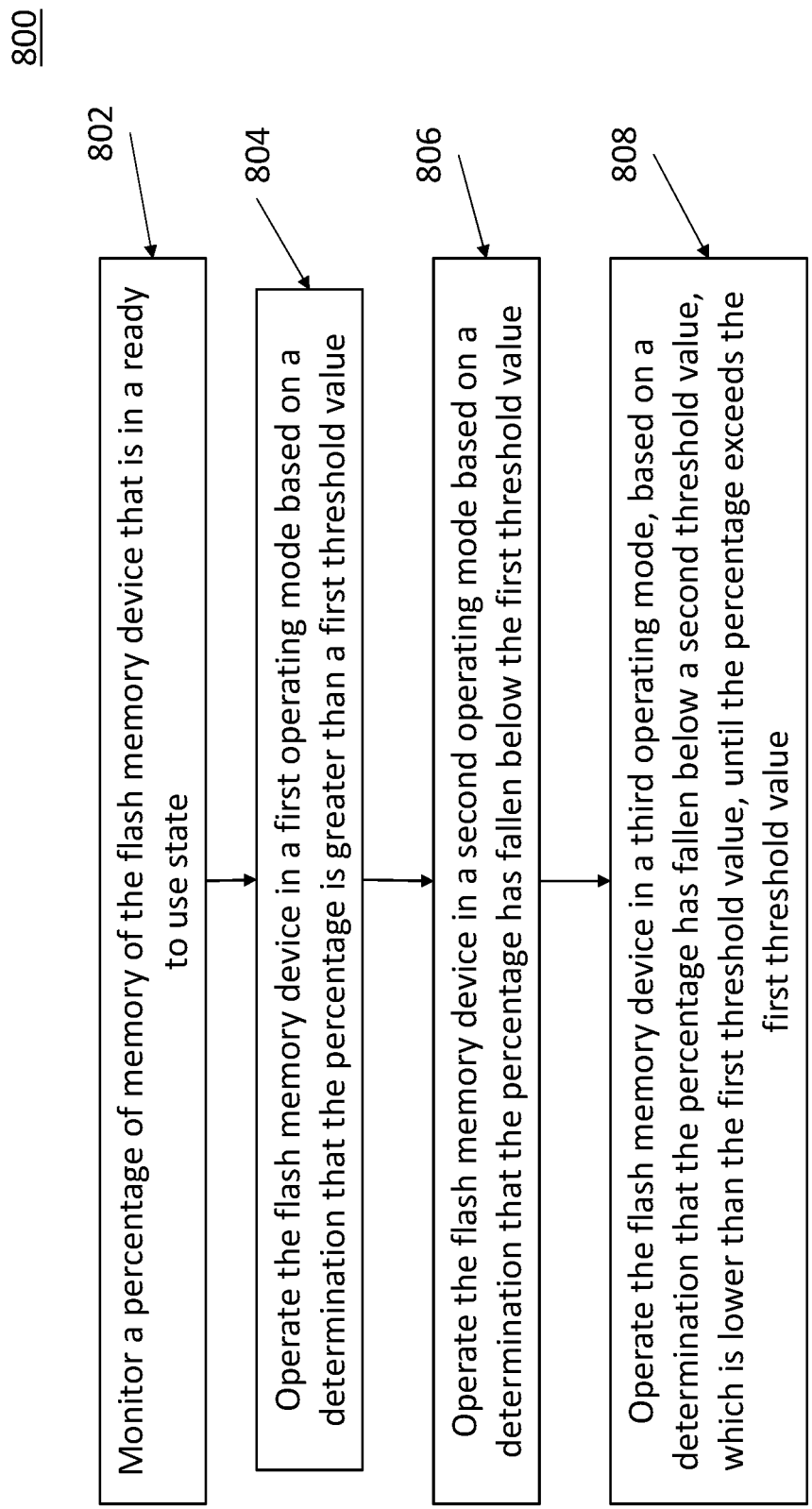
FIG. 8 depicts a flow chart diagram of a method controlling the operation of a non-volatile memory in accordance with the present disclosure.

Referring now to FIG. 8, a flow diagram of a method 800 for controlling the operation of a flash memory is shown. The method 800 is configured to employ ready-to-use thresholds to minimize page migrations and maximize parallel erases and thereby improve the operation of the flash memory. As shown at block 802, the method 800 includes monitoring a percentage of memory of the flash memory device that is in a ready-to-use state, also referred to herein as the RTU percentage. As used herein, a block stripe of memory is considered ready-to-use once the block stripe has been erased and is ready to be filled and the percentage of memory of the flash memory device that is in a ready to use state can be calculated by dividing the number of block stripes that are in the ready to use state by the total number of block stripes of the flash memory device.

As shown at block 804, the flash memory device is operated by the controller in a first operating mode based on a determination that the RTU percentage is greater than a first threshold value. During the first operating mode the flash memory device is not low on ready-to-use block stripes and therefore garbage collection is performed only on very dirty block stripes. As used herein, a very dirty block stripe is a block stripe that has exceeds a first dirty threshold, such as 95% dirty During the first operating mode, no erases are performed, even though there may be block stripes that are ready to erase (RTE), which avoids unnecessary collisions of reads/programs with erases. An RTE block stripe is a block stripe that has had all valid data moved to other locations in flash memory device (i.e. 100% dirty).

As shown at block 806, the flash memory device is operated by the controller in a second operating mode based on a determination that the RTU percentage has fallen below the first threshold value. During the second operating mode the flash memory device is low on ready to use block stripes and therefore garbage collection is performed only on dirty block stripes. As used herein, a dirty block stripe is a block stripe that has the greatest number of invalidated pages. Similar to the first operating mode, during the second operating mode, no erases are performed, even though there may be block stripes that are RTE, which avoids unnecessary collisions of reads/programs with erases.

As shown at block 808, the flash memory device is operated by the controller in a third operating mode based on a determination that the RTU percentage has fallen below a second threshold value, which is lower than the first threshold value, until the RTU percentage exceeds the first threshold value. During the third operating mode, the flash memory device is very low on ready-to-use block stripes, and therefore garbage collection is performed on dirty block stripes and RTE block stripes are erased. Because there is likely to be a backlog of block stripes that are RTE, it is also very likely that block stripes for many different dies are available which may be erased in parallel. In exemplary embodiments, the RTE block stripes are selected for erasure to minimize program/program collisions and to minimize program/erase collisions. As RTE block stripes are erased, the RTU percentage increases, and once the RTU percentage exceeds the first threshold value, the flash memory device will return to the first operating mode, and thus erases will stop being performed. This produces a hysteresis between the first threshold value and the second threshold value for erases which greatly increases the parallelism of erases since it greatly increases the likelihood of having RTE block stripes from different dies to select from.

In one embodiment, a flash memory device is operated in the first operating mode until the RTU percentage drops below six percent. During the first operating mode, valid data is removed only from block stripes that are over 95% dirty and these block stripes are marked as RTE. Once the RTU percentage drops below six percent, the flash memory device is operated in the second operating mode. During the second operating mode, valid data is removed from block stripes that have the greatest number of invalidated pages, i.e. the dirtiest block stripes, and these block stripes are marked as RTE. Once the RTU percentage drops below five percent, the flash memory device is operated in the third operating mode. During the third operating mode, valid data continues to be moved from block stripes that are the dirtiest and these block stripes are marked as RTE. In addition, during the third operating mode RTE block stripes are erased until the RTU percentage rises back above six percent.

As discussed above, the data stored on the flash memory device can be classified into various heat bins based on the frequency that the data is accessed. In exemplary embodiments, each die is assigned to a specific heat bin and only data associated with that heat bin is stored on that die. In exemplary embodiments, the flash controller utilizes a die sequencer to select dies which may be programmed, or filled, and to select dies which may be erased. In one embodiment, the flash memory includes four block stripe sets for each of three heat levels, hot, warm, and cold. At any point in time, programs may be issued to half of or two out of the four, block stripe sets for each heat level, while the other half of the block stripe sets are queued to be used (pending) when a block stripe sets is completely programmed. As will be appreciated by those of ordinary skill in the art, the above rules work no matter the number of dies available, however, a better job can be done when there are more dies to pick from (e.g. 16 vs. 8). The number of dies #s available generally depends on how many NAND modules are configured on the product.

In one embodiment, the die sequencer is configured to select block stripe sets for filling (programming) across as many dies as possible to avoid program/program collisions and to select block stripe sets for erases to avoid dies which may be filling to avoid program/erase collisions. Referring now to FIG. 9, a table 900 is used by the die sequencer for determining which die to use for a pending fill or erase operation is shown. As illustrated, the table 900 keeps track of which dies are actively being filled with data (i.e. and thus may be actively have programs occurring) and which dies are pending to be filled (i.e. will be the next dies in order to be filled with data) for each of the heat levels (i.e., hot, warm or cold) of the data stored on each die.

In exemplary embodiments, the die sequencer selects a die for filing by identifying a die which is not currently being used for a Fill on the same heat level as the data to be written. If there is not a block stripe available for a die which is not currently being used for a Fill on the same heat level, then another die on the same heat level as the data to be written is chosen for which a block stripe is available.

In exemplary embodiments, the die sequencer selects a die for erasing by identifying a die that is not currently being used for a fill operation. If multiple dies are not currently being used for a fill operation, a die is chosen among them in a round-robin fashion. If all dies are currently being used for a fill operation, a die is chosen in a round-robin fashion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for managing a flash memory device, the method comprising:
    monitoring a percentage of memory of the flash memory device that is in a ready to use state, wherein the flash memory device includes a plurality of dies each comprising a plurality of memory block stripes;
    based on a determination that the percentage is greater than a first threshold value, operating the flash memory device in a first operating mode;
    based on a determination that the percentage has fallen below the first threshold value; operating the flash memory device in a second operating mode; and
    based on a determination that the percentage has fallen below a second threshold value, which is lower than the first threshold value, operating the flash memory device in a third operating mode until the percentage exceeds the first threshold value,
    maintaining a heat level for each of the plurality of memory block stripes on each of the plurality of dies;
    maintaining an operational state of each of the plurality of dies,
    identifying one of the plurality of memory block stripes for filling with an data set based on a heat level of the data set, the operational state of plurality of dies and the heat level for each of the plurality of memory block stripes, wherein the one of the plurality of memory block stripes for filling is selected to have a heat level that is equal to the heat level of the data set,
    wherein erasing of ready to erase memory block stripes is only performed during the third operating mode, and
    wherein the third operating mode includes:
    selecting a ready to erase memory block for erasure, wherein the selecting of the ready to erase memory block for erasure includes prioritizing erasure of block stripes located on dies that are not currently being used for a fill operation and selecting a block stripe in a round-robin fashion based on a determination that all dies are currently being used for fill operation;
    erasing the selected ready to erase memory block; and
    marking the erased memory block as ready to use.

2. The method of claim 1, wherein the first operating mode includes:
    identifying one or more memory block stripes of the flash memory device that exceed a first dirty threshold;
    moving valid data from the one or more block stripes to other memory locations in the flash device; and
    marking the one or more memory block stripes as ready to erase.

3. The method of claim 2, wherein the second operating mode includes:
    identifying one or more memory block stripes of the flash memory device that exceed a second dirty threshold, wherein the second dirty threshold is lower than the first dirty threshold;
    moving valid data from the one or more block stripes to other memory locations in the flash device; and
    marking the one or more memory block as ready to erase.

4. The method of claim 1, wherein
    wherein the selection of the ready to erase memory block for erasure is based at least in part on the operational state of plurality of dies and the heat level for each of the plurality of memory block stripes.

5. The method of claim 4, wherein the selecting of the ready to erase memory block for erasure is configured to avoid program/erase collisions.

6. The method of claim 1, wherein the third operating mode further includes:
    identifying one or more memory block stripes of the flash memory device that exceed a second dirty threshold, wherein the second dirty threshold is lower than a first dirty threshold;
    moving valid data from the one or more block stripes to other memory locations in the flash device; and
    marking the one or more memory block as ready to erase.

7. A computer program product, comprising:
    a storage device; and
    program code stored in the storage device, wherein the program code, when executed by a controller that controls a non-volatile memory array of a data storage system, causes the controller to:
    monitor a percentage of memory of the flash memory device that is in a ready to use state, wherein the flash memory device includes a plurality of dies each comprising a plurality of memory block stripes;
    based on a determination that the percentage is greater than a first threshold value, operate the flash memory device in a first operating mode;
    based on a determination that the percentage has fallen below the first threshold value; operate the flash memory device in a second operating mode;
    based on a determination that the percentage has fallen below a second threshold value, which is lower than the first threshold value, operate the flash memory device in a third operating mode until the percentage exceeds the first threshold value,
    maintain a heat level for each of the plurality of memory block stripes on each of the plurality of dies;
    maintain an operational state of each of the plurality of dies, and
    identify one of the plurality of memory block stripes for filling with an data set based on a heat level of the data set, the operational state of plurality of dies and the heat level for each of the plurality of memory block stripes, wherein the one of the plurality of memory block stripes for filling is selected to have a heat level that is equal to the heat level of the data set,
    wherein erasing of ready to erase memory block stripes is only performed during the third operating mode, and
    wherein the third operating mode includes:
    selecting a ready to erase memory block for erasure, wherein the selecting of the ready to erase memory block for erasure includes prioritizing erasure of block stripes located on dies that are not currently being used for a fill operation and selecting a block stripe in a round-robin fashion based on a determination that all dies are currently being used for fill operation;
    erasing the selected ready to erase memory block; and
    marking the erased memory block as ready to use.

8. The computer program product of claim 7, wherein the first operating mode includes:

identifying one or more memory block stripes of the flash memory device that exceed a first dirty threshold;

moving valid data from the one or more block stripes to other memory locations in the flash device; and marking the one or more memory block stripes as ready to erase.

9. The computer program product of claim 8, wherein the second operating mode includes:

identifying one or more memory block stripes of the flash memory device that exceed a second dirty threshold, wherein the second dirty threshold is lower than the first dirty threshold;

moving valid data from the one or more block stripes to other memory locations in the flash device; and marking the one or more memory block as ready to erase.

10. The computer program product of claim 7, wherein the selection of the ready to erase memory block for erasure is based at least in part on the operational state of plurality of dies and the heat level for each of the plurality of memory block stripes.

11. The computer program product of claim 10, wherein the third operating mode further includes:

identifying one or more memory block stripes of the flash memory device that exceed a second dirty threshold, wherein the second dirty threshold is lower than a first dirty threshold;

moving valid data from the one or more block stripes to other memory locations in the flash device; and marking the one or more memory block as ready to erase.

12. The computer program product of claim 7, wherein the selecting of the ready to erase memory block for erasure is configured to avoid program/erase collisions.

13. A data storage system, comprising:

a controller configured to be coupled to a non-volatile memory array, wherein the controller is configured to:

monitor a percentage of memory of the flash memory device that is in a ready to use state, wherein the flash memory device includes a plurality of dies each comprising a plurality of memory block stripes;

based on a determination that the percentage is greater than a first threshold value, operate the flash memory device in a first operating mode;

based on a determination that the percentage has fallen below the first threshold value; operate the flash memory device in a second operating mode; and based on a determination that the percentage has fallen below a second threshold value, which is lower than the first threshold value, operate the flash memory device in a third operating mode until the percentage exceeds the first threshold value, maintain a heat level for each of the plurality of memory block stripes on each of the plurality of dies;

maintain an operational state of each of the plurality of dies, and identify one of the plurality of memory block stripes for filling with an data set based on a heat level of the data set, the operational state of plurality of dies and the heat level for each of the plurality of memory block stripes, wherein the one of the plurality of memory block stripes for filling is selected to have a heat level that is equal to the heat level of the data set, wherein erasing of ready to erase memory block stripes is only performed during the third operating mode, and wherein the third operating mode includes:

selecting a ready to erase memory block for erasure, wherein the selecting of the ready to erase memory block for erasure includes prioritizing erasure of block stripes located on dies that are not currently being used for a fill operation and selecting a block stripe in a round-robin fashion based on a determination that all dies are currently being used for fill operation;

erasing the selected ready to erase memory block; and marking the erased memory block as ready to use.

14. The data storage system of claim 13, wherein the first operating mode includes:

identifying one or more memory block stripes of the flash memory device that exceed a first dirty threshold;

moving valid data from the one or more block stripes to other memory locations in the flash device; and marking the one or more memory block stripes as ready to erase.

15. The data storage system of claim 14, wherein the second operating mode includes:

identifying one or more memory block stripes of the flash memory device that exceed a second dirty threshold, wherein the second dirty threshold is lower than the first dirty threshold;

moving valid data from the one or more block stripes to other memory locations in the flash device; and marking the one or more memory block as ready to erase.

* * * * *